(12) United States Patent
Okura

(10) Patent No.: US 10,467,271 B2
(45) Date of Patent: Nov. 5, 2019

(54) SEARCH APPARATUS AND SEARCH METHOD

(71) Applicant: FUJITSU LIMITED, Kawasaki-shi, Kanagawa (JP)

(72) Inventor: Seiji Okura, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 421 days.

(21) Appl. No.: 15/452,381

(22) Filed: Mar. 7, 2017

(65) Prior Publication Data

US 2017/0262530 A1    Sep. 14, 2017

(30) Foreign Application Priority Data

Mar. 9, 2016 (JP) .................................. 2016-046088

(51) Int. Cl.
*G06F 16/33* (2019.01)
*G06F 16/93* (2019.01)
*G06F 16/24* (2019.01)

(52) U.S. Cl.
CPC .......... *G06F 16/3344* (2019.01); *G06F 16/93* (2019.01)

(58) Field of Classification Search
CPC .. G06F 16/3329; G06F 16/3344; G06F 16/93; G06F 16/243
USPC ............. 707/999.1, E17.044, E17.068, 802, 707/999.101, 999.107
See application file for complete search history.

(56) References Cited

U.S. PATENT DOCUMENTS

| | | | | |
|---|---|---|---|---|
| 6,556,983 B1 * | 4/2003 | Altschuler | ........... | G06K 9/6296 706/55 |
| 9,798,732 B2 * | 10/2017 | Isaacson | ............. | G06F 16/1734 |
| 2004/0093328 A1 * | 5/2004 | Damle | ................ | G06F 17/2785 |
| 2008/0294599 A1 * | 11/2008 | Lei | ......................... | G06F 16/367 |
| 2015/0178853 A1 * | 6/2015 | Byron | .................... | G06Q 40/12 705/30 |
| 2015/0205860 A1 | 7/2015 | Okura et al. | | |

FOREIGN PATENT DOCUMENTS

| JP | 2012-3603 | 1/2012 |
|---|---|---|
| JP | 2014-153744 | 8/2014 |
| JP | 2015-138351 | 7/2015 |

* cited by examiner

*Primary Examiner* — Kris E Mackes
*Assistant Examiner* — Cecile H Vo
(74) *Attorney, Agent, or Firm* — Xsensus LLP

(57) ABSTRACT

A computer generates searching context information relating to appearance frequencies of words or semantic codes in a searching query sentence from the searching query sentence. Semantic analysis is performed on sentences included in documents so as to generate semantic structures, and each of the semantic structures includes three or more semantic codes and a relationship type among the semantic codes. A plurality of context information is generated and each context information relates to an appearance frequency of a word or a semantic code in a group of documents that match each of the semantic structures. The computer specifies one semantic structure of the semantic structures in accordance with the searching context information and the plurality of context information, and searches for a similar document by using the specified semantic structure.

15 Claims, 16 Drawing Sheets

SS1: A SYSTEM IS DIFFERENT DEPENDING ON COUNTRY

SS2: SYSTEMS OF DIFFERENT COUNTRIES

| 3-TUPLE | LIST OF DOCUMENT IDS |
|---|---|
| 0xKO, 0xKU, 0xKR<br>DIFFERENT COUNTRY BETWEEN | 363, 569, 2002, 4029, 4039, 6093, ... |
| 0xKO, 0xKU, 0xN3<br>DIFFERENT COUNTRY JAPAN | 363, 2039, 3002, 4031, 4039, 8091, ... |
| 0xAM, 0xKO, 0xKU<br>US DIFFERENT COUNTRY | 2998, 3091, 5983, 5992, 8001, ... |
| 0xKO, 0xKU, 0xS8-1<br>DIFFERENT COUNTRY SYSTEM | 389, 2938, 6023, 7983, 7992, 8329, ... |
| 0xKO, 0xKU, 0xS8-2<br>DIFFERENT COUNTRY SYSTEM | 423, 4039, 5543, 6852, 8001, 8938, ... |

F I G. 7

SEARCH APPARATUS AND SEARCH METHOD

CROSS-REFERENCE TO RELATED APPLICATION

This application is based upon and claims the benefit of priority of the prior Japanese Patent Application No. 2016-046088, filed on Mar. 9, 2016, the entire contents of which are incorporated herein by reference.

FIELD

The embodiments discussed herein are related to a search apparatus and a search method.

BACKGROUND

In recent years, information on the Internet has been explosively increasing, and businesses using big data has been increasing. Due to an increase in big data, a high-speed search technology is desired, and in particular, it has become important to search for a semantic structure in a text document.

Morphological analysis, semantic analysis, or the like is used to analyze a natural sentence used for text search. Morphological analysis is processing for dividing a character string into morphemes and adding information such as a part of speech or an attribute to each of the morphemes. The morphemes obtained as a result of morphological analysis may be treated as words.

Semantic analysis is processing for obtaining a semantic structure of a natural sentence by using a morphological analysis result of the natural sentence. By using the semantic structure that is a semantic analysis result, what the natural sentence means can be expressed as data to be handled by a computer.

The semantic structure includes a plurality of semantic codes that respectively indicate the meanings of a plurality of words included in the morphological analysis result, and information indicating the type of a relationship between two semantic codes. One semantic code may correspond to a plurality of words. The semantic structure can be expressed, for example, by a digraph that is configured of a plurality of nodes indicating a plurality of semantic codes and arcs that each indicate the type of a relationship between two nodes. A minimum elemental structure of the semantic structure is referred to as a semantic minimum unit, and is configured of two nodes and an arc between these nodes.

By performing morphological analysis and semantic analysis on text data included in a plurality of documents, similar document search is realized in which a plurality of documents that have a meaning similar to that of a searching query sentence that is a search request of a natural sentence are searched for by using a semantic structure of the searching query sentence.

A technology is known in which, in similar document search, search keys acting as noise are determined according to the number of documents that match the search keys and evaluation values of documents that correspond to the search keys are recalculated (see, for example, Patent Document 1). A technology is also known for searching for similar documents according to a degree of similarity in a feature vector or a relevance ratio of vocabulary between a search word and documents to be searched, (see, for example, Patent Documents 2 and 3).

Patent Document 1: Japanese Laid-open Patent Publication No. 2015-138351
Patent Document 2: Japanese Laid-open Patent Publication No. 2014-153744
Patent Document 3: Japanese Laid-open Patent Publication No. 2012-3603

SUMMARY

According to an aspect of the embodiments, a non-transitory computer-readable recording medium stores a search program. The search program causes a computer to execute the process below.

(1) The computer generates searching context information relating to appearance frequencies of words or semantic codes in a searching query sentence from the searching query sentence.

(2) The computer specifies one semantic structure from among a plurality of semantic structures in accordance with a plurality of context information and the searching context information by using a correspondence relationship between the plurality of semantic structures and the plurality of context information.

(3) The computer searches for a similar document from a plurality of documents by using the specified semantic structure.

The correspondence relationship is generated by performing semantic analysis on a plurality of sentences included in the plurality of documents, by generating the plurality of semantic structures based on relationship types among a plurality of semantic codes included in each of the plurality of sentences, by generating the plurality of context information, and by respectively associating the plurality of semantic structures with the plurality of context information.

Each of the plurality of semantic structures includes three or more semantic codes and a relationship type among the three or more semantic codes. Each of the plurality of context information relates to an appearance frequency of a word or a semantic code in a group of documents that match each of the plurality of semantic structures from among the plurality of documents.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates a search index.

DESCRIPTION OF EMBODIMENTS

Figure 1:
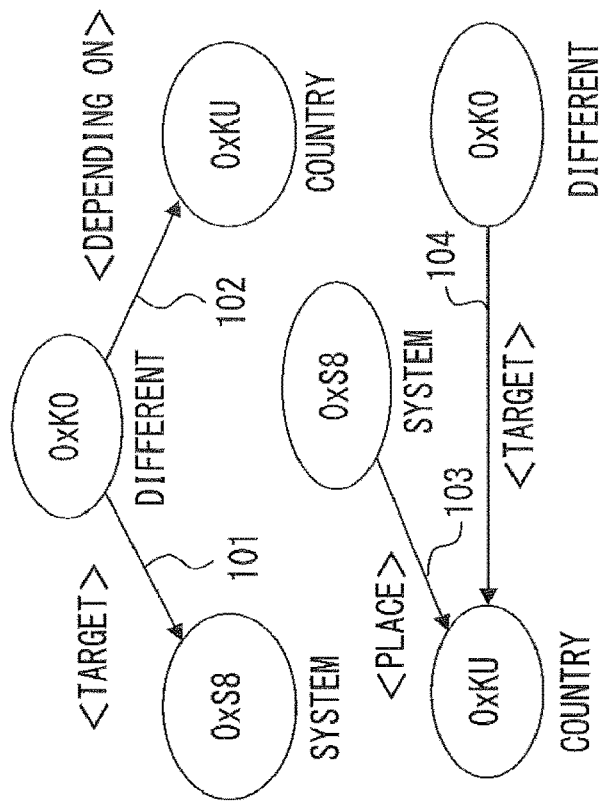
FIG. 1 illustrates a semantic structure including a 3-tuple.

Embodiments are described below in detail with reference to the drawings.

In similar document search using a semantic structure, a semantic structure of each of the sentences included in a document to be searched is broken down in advance into semantic minimum units, and the generated semantic minimum units are stored in a database. A searching query sentence that is a search request of a natural sentence is received as an input, semantic minimum units are calculated from a semantic structure of the searching query sentence, and the database is searched by using the respective semantic minimum units as search keys. At this time, a score is set for each of the semantic minimum units, and the score of each of the documents is calculated according to the total of the scores of matching semantic minimum units.

In the information search device described in Patent Document 1, a search key that does not specify the type of a relationship between semantic codes is generated instead of a semantic minimum unit by arbitrarily combining two semantic codes included in a searching query sentence. A search key that acts as noise is determined in accordance with the number of documents that match the search key, the weight of the search key is reduced, and the score of a document is calculated. Consequently, search omission in which a desired document is overlooked can be prevented.

However, a set of two semantic codes matches a larger number of documents than a semantic minimum unit, and therefore many documents that act as noise other than a desired document are included in a search result. In addition, the number of search keys drastically increases, and therefore a calculation amount increases.

Accordingly, a case is considered in which a set of three semantic codes (a 3-tuple) is used as a search key, instead of the set of two semantic codes (a 2-tuple).

As an example, it is assumed that an effect of narrowing documents to be searched per semantic code is $1/10$. A narrowing effect of $(1/10)*(1/10)=1/100$ is expected by using a 2-tuple search key. On the other hand, a narrowing effect of $(1/10)*(1/10)*(1/10)=1/1000$ is expected by using a 3-tuple search key. Accordingly, it is considered that the effect of narrowing documents to be searched increases about tenfold in a case in which the 3-tuple search key is used, in comparison with a case in which the 2-tuple search key is used.

In generating search keys from a searching query sentence, when sets of three semantic codes are simply generated, an enormous number of combinations are generated. However, there is a restriction of "a 3-tuple for searching for a semantic structure", and therefore it is considered that a significant ratio of the simply generated 3-tuples do not match a database. Accordingly, the number of 3-tuples that are actually used as search keys does not increase so much.

As an example, a noun is not connected to an adverb, and therefore a 3-tuple that corresponds to three words such as "rapidly, device, image" or "rapidly, device, processing" can be excluded from search keys. In addition, an adjective is not connected to a verb, and therefore a 3-tuple that corresponds to "rapid, move, stop" or the like can also be excluded from the search keys. When analyze is actually performed on about ten thousand natural sentences, the following result is obtained.

The number of semantic codes: 35442

The number of types of a 2-tuple: 123896

The number of types of a 3-tuple: 63059

The appearance frequencies of 2-tuples and 3-tuples that appear in a document at a high frequency are calculated, and it has been discovered that, on average, a narrowing effect of the 3-tuple is ten times as large as that of the 2-tuple or more. As described above, the number of types of the 3-tuple does not increase in comparison with the 2-tuple, and the 3-tuple has a larger narrowing effect than the 2-tuple. Therefore, it is considered that a calculation amount is reduced such that search can be performed at a higher speed, by using the 3-tuple as a search key.

On the other hand, noise documents included in a search result are not always reduced. In the case of the 2-tuple, even when search is performed by using only a search key that matches a smaller number of documents, all of the desired documents are included in a search result. However, in the case of the 3-tuple, when search is performed by using the search key that matches a smaller number of documents, desired documents are omitted.

As an example, a case is considered in which a 3-tuple such as "0xK0, 0xKU, 0xS8" is generated from a searching query sentence Q1 such as "A system is different between Japan and the US or China, but what is a specific example of a difference between countries?". Here, "0xK0", "0xKU", and "0xS8" represent semantic codes that respectively correspond to "different", "country", and "system".

FIG. 1 illustrates an example of a semantic structure including the 3-tuple "0xK0, 0xKU, 0xS8". SS1 is a semantic structure that means "a system is different depending on the country", and SS1 includes three nodes that respectively correspond to "0xK0", "0xKU", and "0xS8". Arc 101 indicates "target", and arc 102 indicates "depending on". SS2 is a semantic structure that means "systems of different countries", and SS2 includes three nodes that respectively correspond to "0xK0", "0xKU", and "0xS8". Arc 103 indicates "place", and arc 104 indicates "target".

In this case, the semantic structure SS1 has a meaning that is closer to that of the searching query sentence Q1, and therefore the semantic structure SS1 is a search key that meets the intention of a query. Accordingly, in similar document search in which a document that has a meaning similar to that of the searching query sentence Q1 is searched for, a document including SS1 is a desired document. However, a large number of documents match SS1, and a small number of documents match SS2. Therefore, similarly to Patent Document 1, when noise determination is performed on search keys in accordance with only the appearance frequency of a semantic structure in a document, SS1 is determined to be noise, and the weight of SS1 is reduced in the score of the document.

As described above, a 3-tuple has variations in a semantic structure according to the type of a relationship between semantic codes, unlike a 2-tuple. Therefore, when a noise determination method for the 2-tuple is applied to the 3-tuple with no change, search omission of a desired document may occur.

In the case of the 3-tuple, even when semantic structures include the same combination of semantic codes, which of the semantic structures is compatible with the semantic structure of a desired document differs depending on a query, and this problem of compatibility arises more clearly than in the case of the 2-tuple. In particular, in the case of a 3-tuple that appears in a document at a high frequency, a semantic structure greatly affects a search result.

The problem above does not arise only in a case in which a set of three semantic codes is used as a search key, but also arises in a case in which a set of four or more semantic codes is used as a search key.

Figure 2:
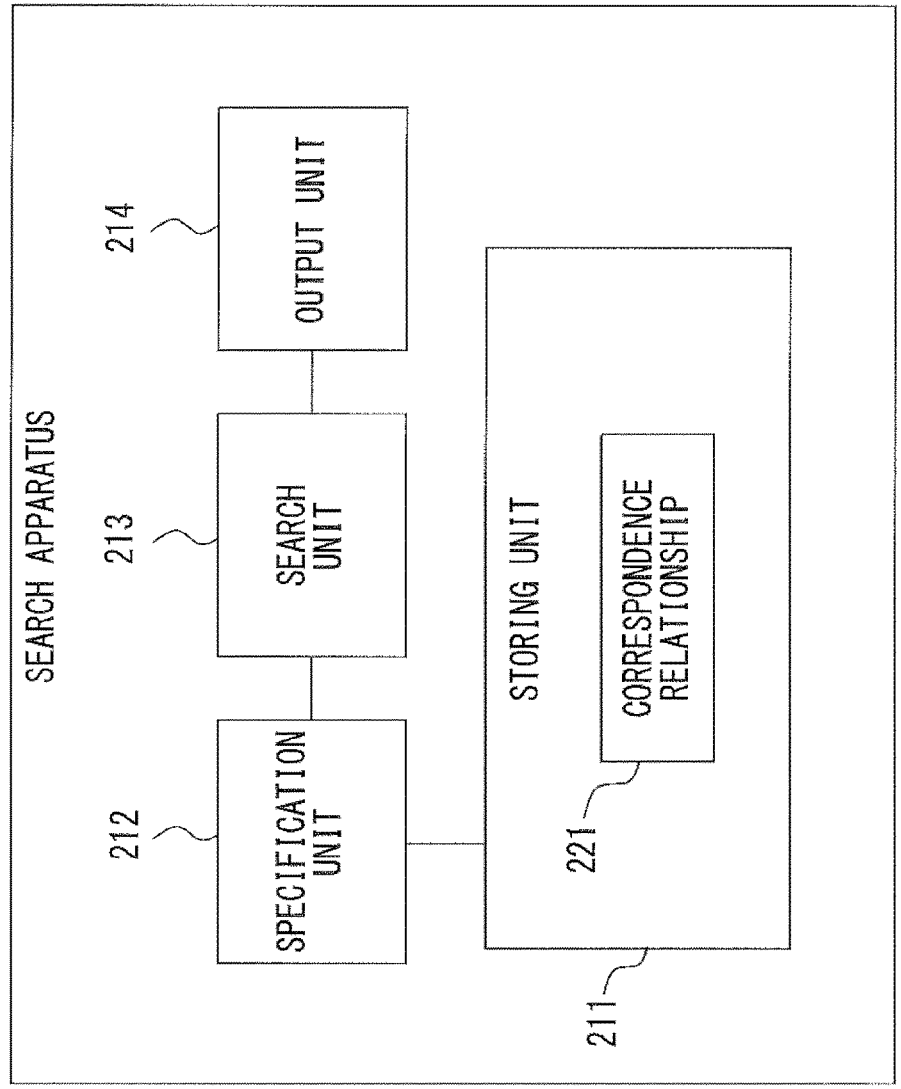
FIG. 2 is a functional block diagram illustrating a search apparatus.

FIG. 2 illustrates an example of a functional configuration of a search apparatus according to the embodiments. A search apparatus 201 includes a storing unit 211, a specification unit 212, a search unit 213, and an output unit 214. The storing unit 211 stores a correspondence relationship 221 between a plurality of semantic structures and a plurality of context information. By performing semantic analysis on a plurality of sentences included in a plurality of documents, a plurality of semantic structures are generated based on relationship types among a plurality of semantic codes included in each of the plurality of sentences, and each of the semantic structures includes three or more semantic codes and a relationship type among the three or more semantic codes. In addition, a plurality of context information is generated and each of the plurality of context information relates to an appearance frequency of a word or a semantic code in a group of documents that respectively match each of the plurality of semantic structures from among the plurality of documents, and the plurality of semantic structures are associated with the plurality of context information such that the correspondence relationship 221 is generated.

The specification unit 212 specifies a semantic structure that corresponds to a searching query sentence by using the correspondence relationship 221 stored in the storing unit 211. The search unit 213 searches for a similar document by using the semantic structure specified by the specification unit 212. The output unit 214 outputs a search result.

Figure 3:
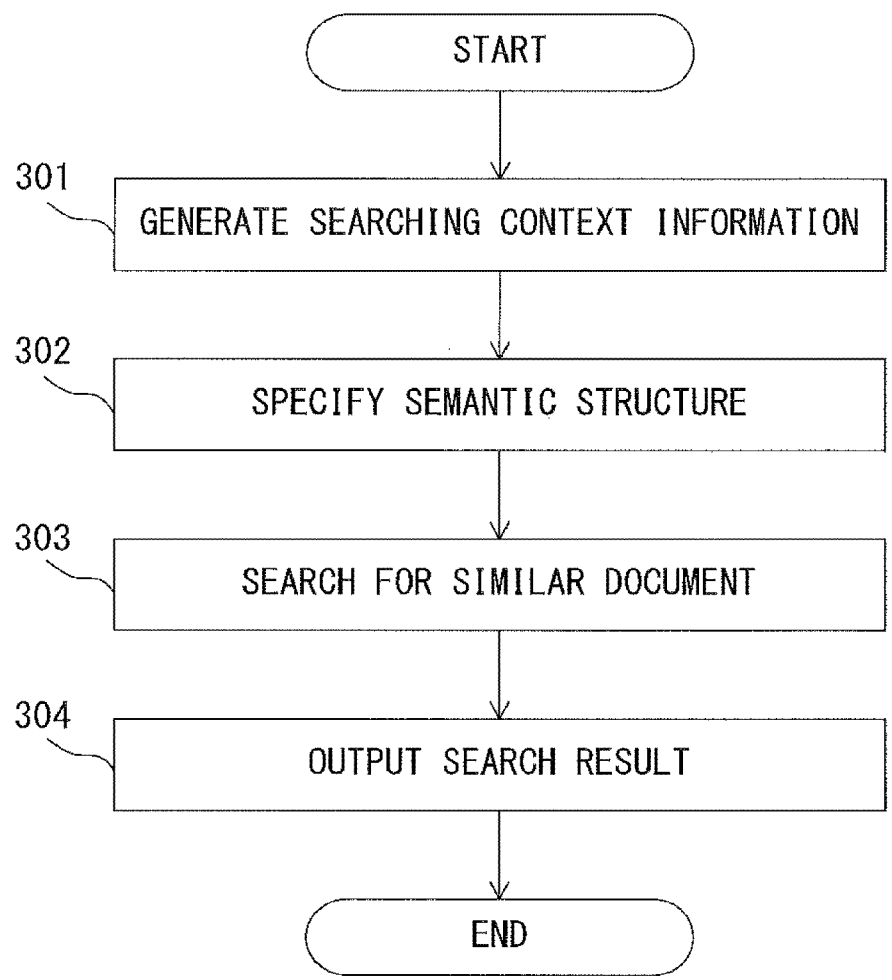
FIG. 3 is a flowchart of similar document search processing.

FIG. 3 is a flowchart illustrating an example of similar document search processing performed by the search apparatus 201 of FIG. 2. First, the specification unit 212 generates searching context information relating to appearance frequencies of words or semantic codes in a searching query sentence (step 301). Then, the specification unit 212 specifies one semantic structure of the plurality of semantic structures included in the correspondence relationship 221 in accordance with the generated searching context information and the plurality of context information included in the correspondence relationship 221 (step 302). The search unit 213 searches for a similar document from the plurality of documents by using the semantic structure specified by the specification unit 212 (step 303). The output unit 214 outputs a search result that indicates the similar document searched for by the search unit 213 (step 304).

By employing the search apparatus 201 of FIG. 1, similar document search can be performed by using an appropriate semantic structure including three or more semantic codes.

Figure 4:
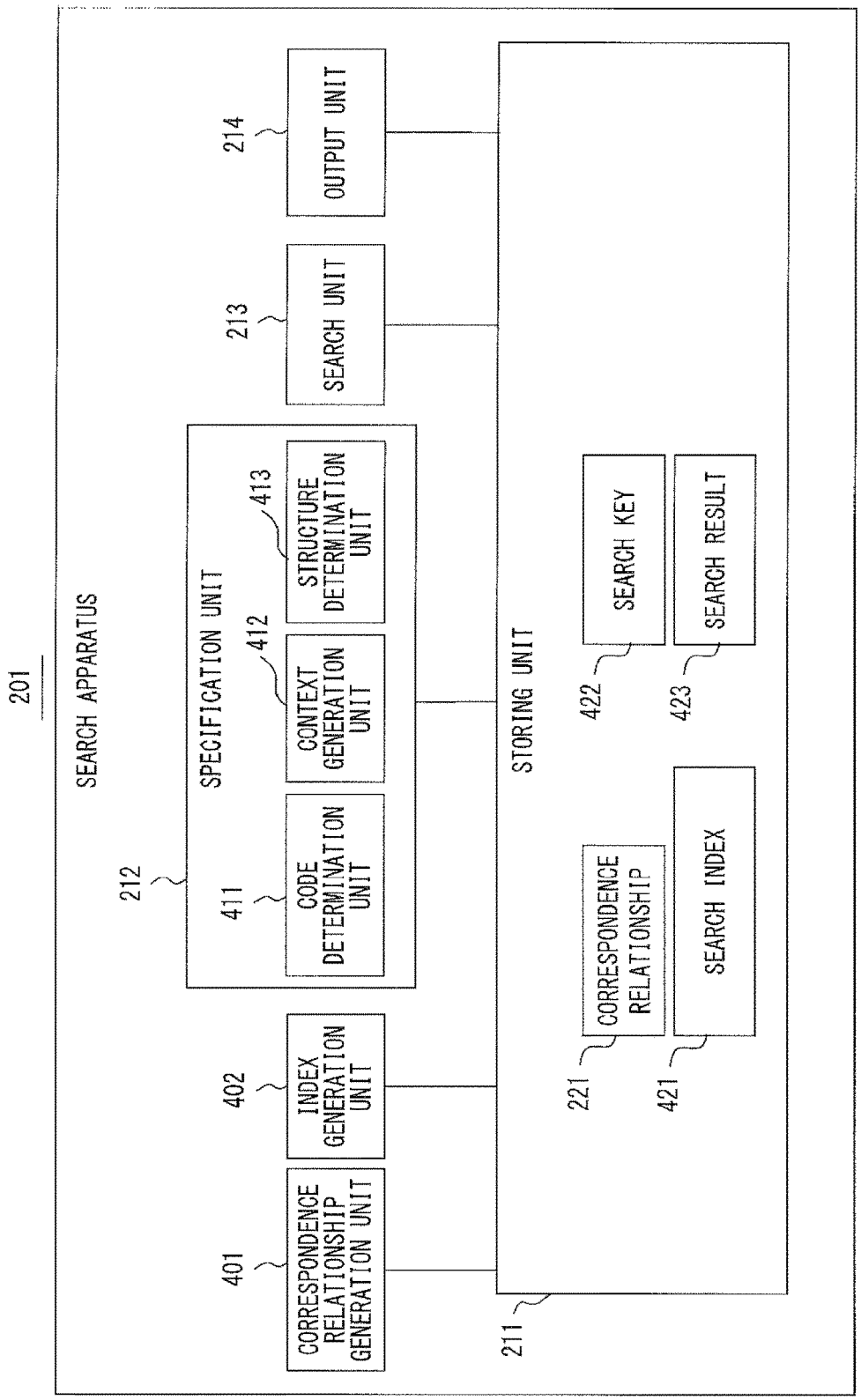
FIG. 4 is a functional block diagram illustrating a specific example of a search apparatus.

FIG. 4 illustrates a specific example of the search apparatus 201 of FIG. 2. The search apparatus 201 of FIG. 4 includes a storing unit 211, a specification unit 212, a search unit 213, an output unit 214, a correspondence relationship generation unit 401, and an index generation unit 402. The specification unit 212 includes a code determination unit 411, a context generation unit 412, and a structure determination unit 413.

The correspondence relationship generation unit 401 generates a correspondence relationship 221 from a plurality of documents to be searched, and stores the correspondence relationship 221 in the storing unit 211. The index generation unit 402 generates a search index 421 for each of the documents, and stores the search index 421 in the storing unit 211. The correspondence relationship 221 and the search index 421 are used as a database for similar document search processing.

The code determination unit 411 generates a 3-tuple of semantic codes from a plurality of semantic codes included in a searching query sentence, and the context generation unit 412 generates searching context information from the searching query sentence when the 3-tuple satisfies a prescribed condition. The structure determination unit 413 specifies one semantic structure of a plurality of semantic structures included in the correspondence relationship 221 in accordance with the searching context information generated by the context generation unit 412 and plural pieces of context information included in the correspondence relationship 221. The structure determination unit 413 stores the specified semantic structure as a search key 422 in the storing unit 211.

The search unit 213 refers to the search index 421 by using the search key 422 so as to search for a similar document, and stores a search result 423 in the storing unit 211. The output unit 214 outputs the search result 423.

Figure 5:
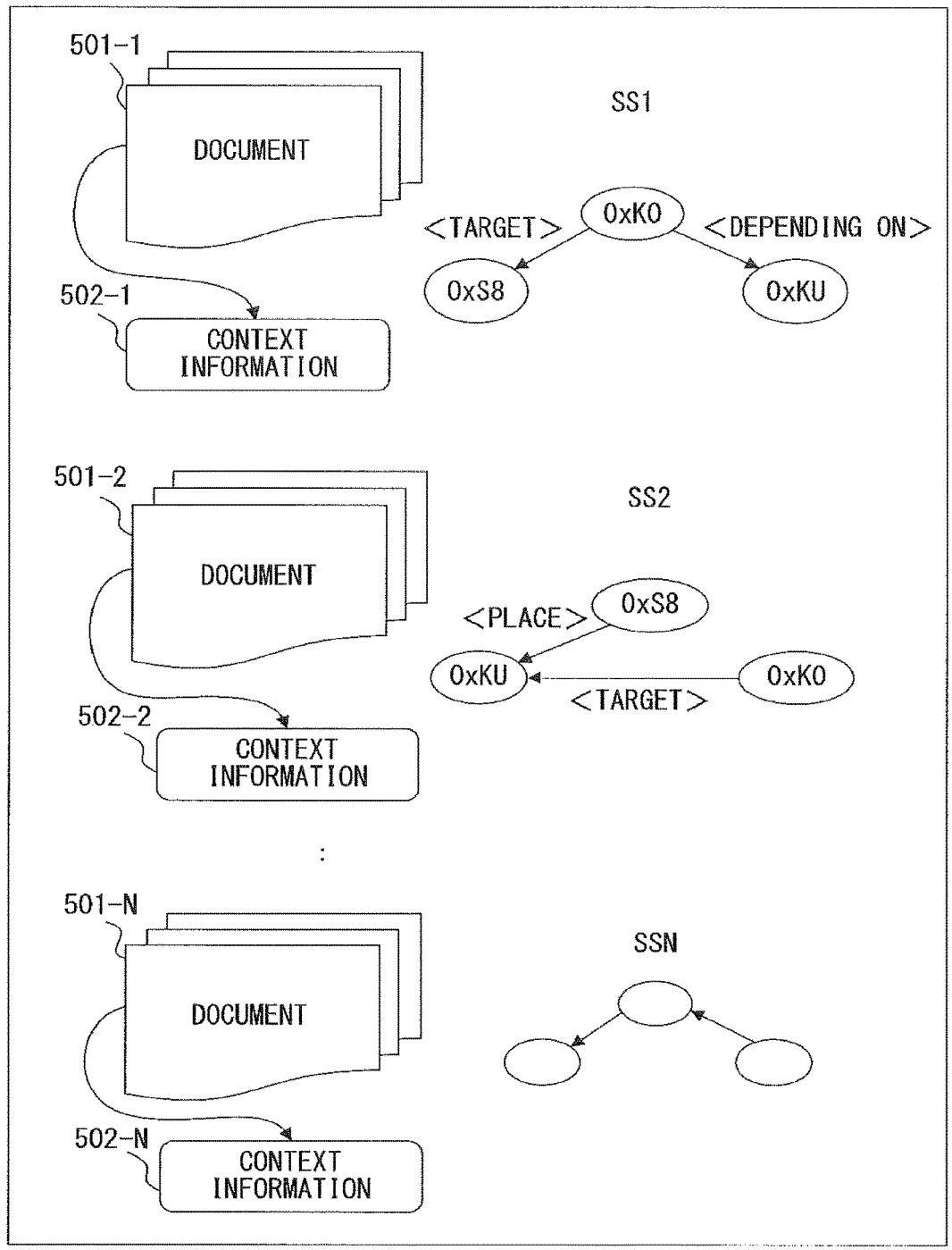
FIG. 5 illustrates correspondence relationship generation processing.

FIG. 5 illustrates an example of correspondence relationship generation processing performed by the correspondence relationship generation unit 401. The correspondence relationship generation unit 401 generates context information that relates to the appearance frequency of a word, a semantic code, a semantic minimum unit, or the like in a plurality of documents for each of the 3-tuple semantic structures included in a document, before similar document search processing is performed. As the appearance frequency, the number of times of appearance or the number of appearance documents is used, for example. As an example, the number of times of appearance of a word indicates the number of times of appearance of the word in all of the documents, and the number of appearance documents of a word indicates the number of documents in which the word appears.

The correspondence relationship generation unit 401 performs semantic analysis on a plurality of sentences included in a plurality of documents to be searched so as to generate SS1 to SSN that are N semantic structures (N is an integer that is greater than or equal to 1) for the 3-tuple "0xK0, 0xKU, 0xS8".

Then, the correspondence relationship generation unit 401 searches for a document including a sentence that matches SSi (i=1 to N) from the plurality of documents, and obtains a document group 501-$i$ that is a set of the searched documents. The correspondence relationship generation unit 401 generates context information 502-$i$ that corresponds to SSi from the document group 501-$i$, and respectively associates SS1 to SSN with context information 502-1 to context information 502-N so as to generate the correspondence relationship 221.

Figure 6:
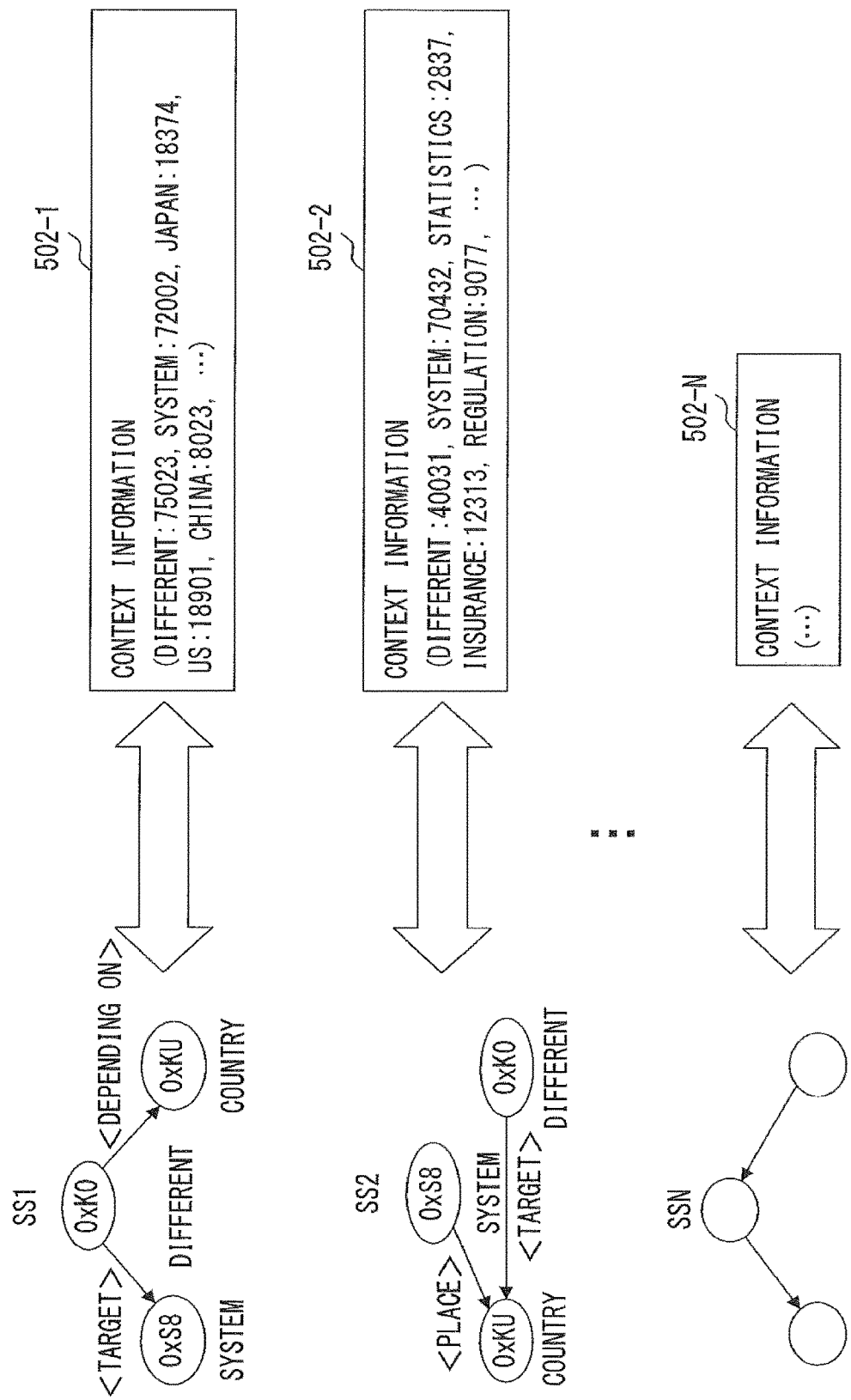
FIG. 6 illustrates a correspondence relationship.

FIG. 6 illustrates an example of the correspondence relationship 221 for SS1 to SSN. Context information 502-1 to context information 502-N of FIG. 6 respectively relate to the numbers of times of appearance of words that respectively correspond to SS1 to SSN in a vector form. As an example, the context information 502-1 that corresponds to SS1 indicates that "different" appears 75023 times, and "system" appears 72002 times in a document group 501-1 that matches SS1. The context information 502-1 further indicates that "Japan" appears 18374 times, "US" appears 18901 times, and "China" appears 8023 times in the document group 501-1.

As described above, the same 3-tuples having different semantic structures from each other match different document groups from each other, and therefore context information also changes. Accordingly, context information that corresponds to each of the semantic structures can be generated.

FIG. 7 illustrates an example of the search index 421 generated by the index generation unit 402. Each of the entries in the search index 421 of FIG. 7 includes a 3-tuple and a list of document IDs. The 3-tuple indicates a set of three semantic codes included in each of the search keys that are used in similar document search processing. A 3-tuple that has a high frequency further includes identification information of a semantic structure. As an example, "−1" of "0xK0, 0xKU, 0xS8-1" corresponds to SS1 of FIG. 6, and "−2" of "0xK0, 0xKU, 0xS8-2" corresponds to SS2. The list of document IDs indicates documents IDs of a plurality of documents that match a search key indicated by a 3-tuple.

Figure 8:
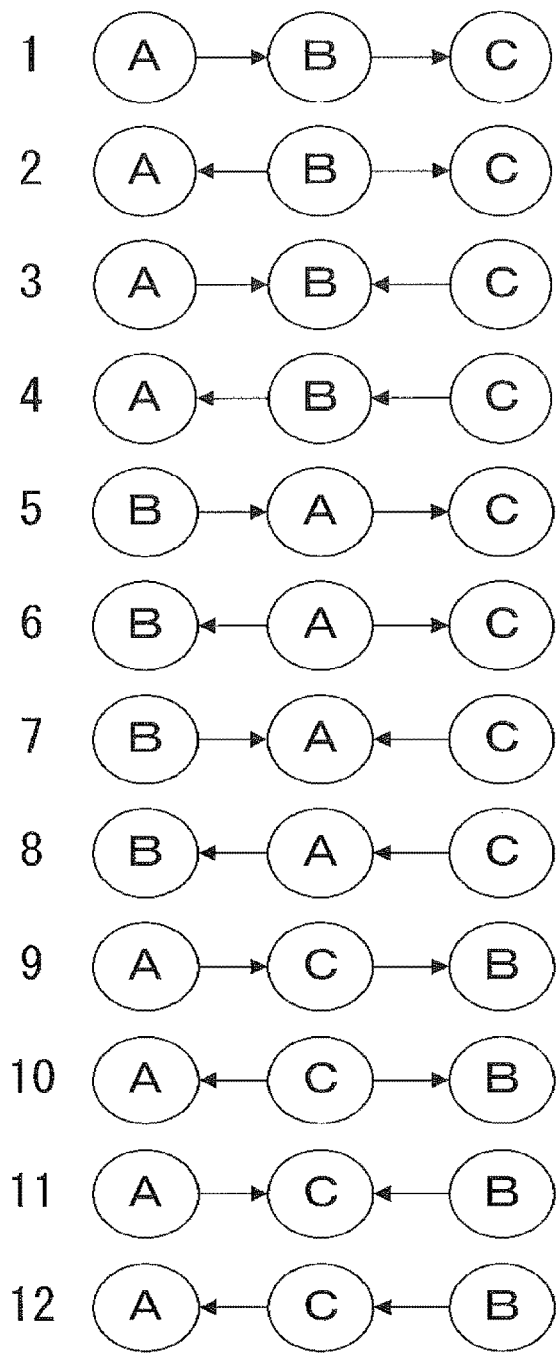
FIG. 8 illustrates variations in a semantic structure for a 3-tuple.

FIG. 8 illustrates examples of variations in a semantic structure for the 3-tuple "A, B, C". In this example, it is assumed that a result of sorting respective semantic codes A, B, and C according to a character string code is the order of A, B, and C. The numbers "1" to "12" of respective semantic structures are used as identification information of the semantic structures in the search index 421. As an example, a semantic structure having the number "7" is expressed as "A, B, C-7".

In similar document search processing, the code determination unit 411 generates a 3-tuple from a searching query sentence that is input as a query. As the searching query sentence, a sentence having a length that is long enough to generate context information is used. As an example, when the searching query sentence Q1 "A system is different between Japan and the US or China, but what is a specific example of a difference between countries?" is input, the code determination unit 411 can generate the 3-tuple "0xK0, 0xKU, 0xS8".

Then, the context generation unit 412 generates searching context information that relates to the appearance frequency of a word, a semantic code, a semantic minimum unit, or the like in the searching query sentence Q1. As the appearance frequency, the number of times of appearance is used, for example. As an example, searching context information that relates to the numbers of times of appearance of words in the searching query sentence Q1 is expressed as "different: 1, system: 1, Japan: 1, US: 1, China: 1, between: 1, country: 1, difference: 1, specific example: 1".

The structure determination unit 413 obtains a degree of similarity between each of plural pieces of context information that is associated with each of a plurality of semantic structures including the 3-tuple generated from the searching query sentence and the searching context information. The structure determination unit 413 selects a semantic structure that is associated with context information having the largest degree of similarity, and stores the semantic structure as the search key 422 in the storing unit 211.

By employing the search apparatus 201 above, when a database is generated, plural pieces of context information that respectively correspond to different semantic structures for the same 3-tuple are generated, and the appearance frequency of each of the semantic structures is learnt. When similar document search processing is performed, context information of a searching query sentence is compared with each of the plural pieces of context information in the database such that an appropriate semantic structure of the 3-tuple included in the searching query sentence can be estimated.

Figure 9:
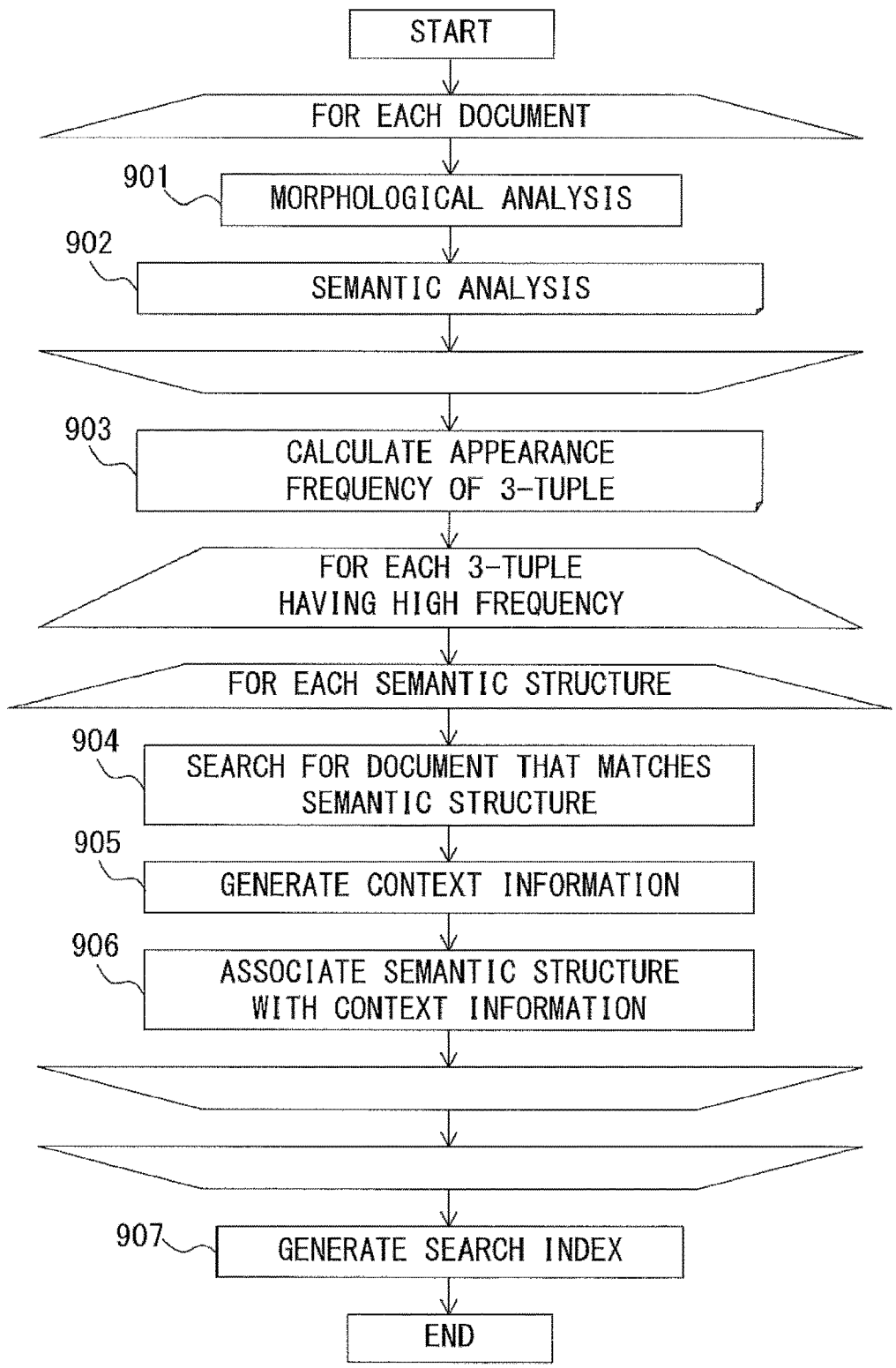
FIG. 9 is a flowchart of database generation processing.

FIG. 9 is a flowchart illustrating an example of database generation processing performed by the correspondence relationship generation unit 401 and the index generation unit 402. First, the correspondence relationship generation unit 401 performs morphological analysis on each of the sentences included in each of the documents to be searched so as to generate a morphological analysis result (step 901), and performs semantic analysis on each of the sentences so as to generate a semantic analysis result (step 902). By repeating the processes of steps 901 and 902 on each of the documents, morphological analysis results and semantic analysis results of all of the documents are generated.

Then, the correspondence relationship generation unit 401 generates a list of semantic codes included in the semantic analysis results of all of the documents, and calculates the appearance frequency of a 3-tuple in all of the documents (step 903). As the appearance frequency, the number of times of appearance or the number of appearance documents is used, for example.

As an example, the following 3-tuples are generated by extracting three arbitrary semantic codes from a list of semantic codes such as "0xK0, 0xKU, 0xS8, 0xKR, 0xN3, 0xAM, 0xC1, 0xP7, 0xKS, 0xHA, . . . ".

"0xK0, 0xKU, 0xS8"
"0xK0, 0xKU, 0xKR"
"0xK0, 0xKU, 0xN3"
"0xK0, 0xKU, 0xAM"
"0xK0, 0xKU, 0xC1"
"0xK0, 0xS8, 0xKR"
"0xK0, 0xS8, 0xN3"
"0xHA, 0xKS, 0xP7"
. . .

The respective semantic codes indicate the following words.

0xK0: "different", "distinct"
0xKU: "country"
0xS8: "system"
0xKR: "between"
0xN3: "Japan"
0xAM: "US", "America"
0xC1: "China"
0xP7: "president"
0xKS: "settlement of account"
0xHA: "announce"

An example of the number of appearance documents of each of the generated 3-tuples is described below.

"0xK0, 0xKU, 0xS8": 60000
"0xK0, 0xKU, 0xKR": 3981
"0xK0, 0xKU, 0xN3": 2359
"0xK0, 0xKU, 0xAM": 1090
"0xK0, 0xKU, 0xC1": 2733
"0xHA, 0xKS, 0xP7": 78370
. . .

Then, the correspondence relationship generation unit 401 performs the processes of steps 904 to 906 on a 3-tuple having a high frequency from among the generated 3-tuples. The 3-tuple having a high frequency is a 3-tuple for which appearance frequency is greater than or equal to a prescribed value. As an example, in a case in which a 3-tuple for which a ratio of the number of appearance documents to the total number of documents M is greater than or equal to K is treated as a 3-tuple having a high frequency, the prescribed value is M*K. When M=100000 and K=0.6, M*K=60000 is established, and "0xK0, 0xKU, 0xS8" and "0xHA, 0xKS, 0xP7", for which the number of appearance documents is greater than or equal to 60000, fall under the 3-tuple having a high frequency.

The correspondence relationship generation unit 401 generates a plurality of semantic structures having different types of a relationship among three semantic codes from each other for each of the 3-tuples having a high frequency (step 904). The correspondence relationship generation unit 401 searches for documents including a sentence that matches each of the semantic structures from all of the documents, and obtains a document group that is a set of the searched documents. Then, the correspondence relationship generation unit 401 generates context information from the obtained document group (step 905), associates each of the semantic structures with context information, and stores them in the correspondence relationship 221 within the storing unit 211 (step 906).

By repeating the processes of steps 904 to 906 on each of the semantic structures, the correspondence relationship 221 for one 3-tuple having a high frequency is generated. By repeating similar processes on each of the 3-tuples having a high frequency, the correspondence relationship 221 for all of the 3-tuples having a high frequency are generated.

Then, the index generation unit 402 associates each of the 3-tuples generated in step 903 with document IDs of documents that match each of the 3-tuples so as to generate the search index 421, and stores the search index 421 in the storing unit 211 (step 907). At this time, the index generation unit 402 distinguishes the 3-tuples having a high frequency according to the semantic structure, and associates each of the 3-tuples having a high frequency with document IDs of matching documents. The index generation unit 402 does not distinguish the other 3-tuples according to the semantic structure, and associates each of the 3-tuples with document IDs of matching documents.

Figure 10:
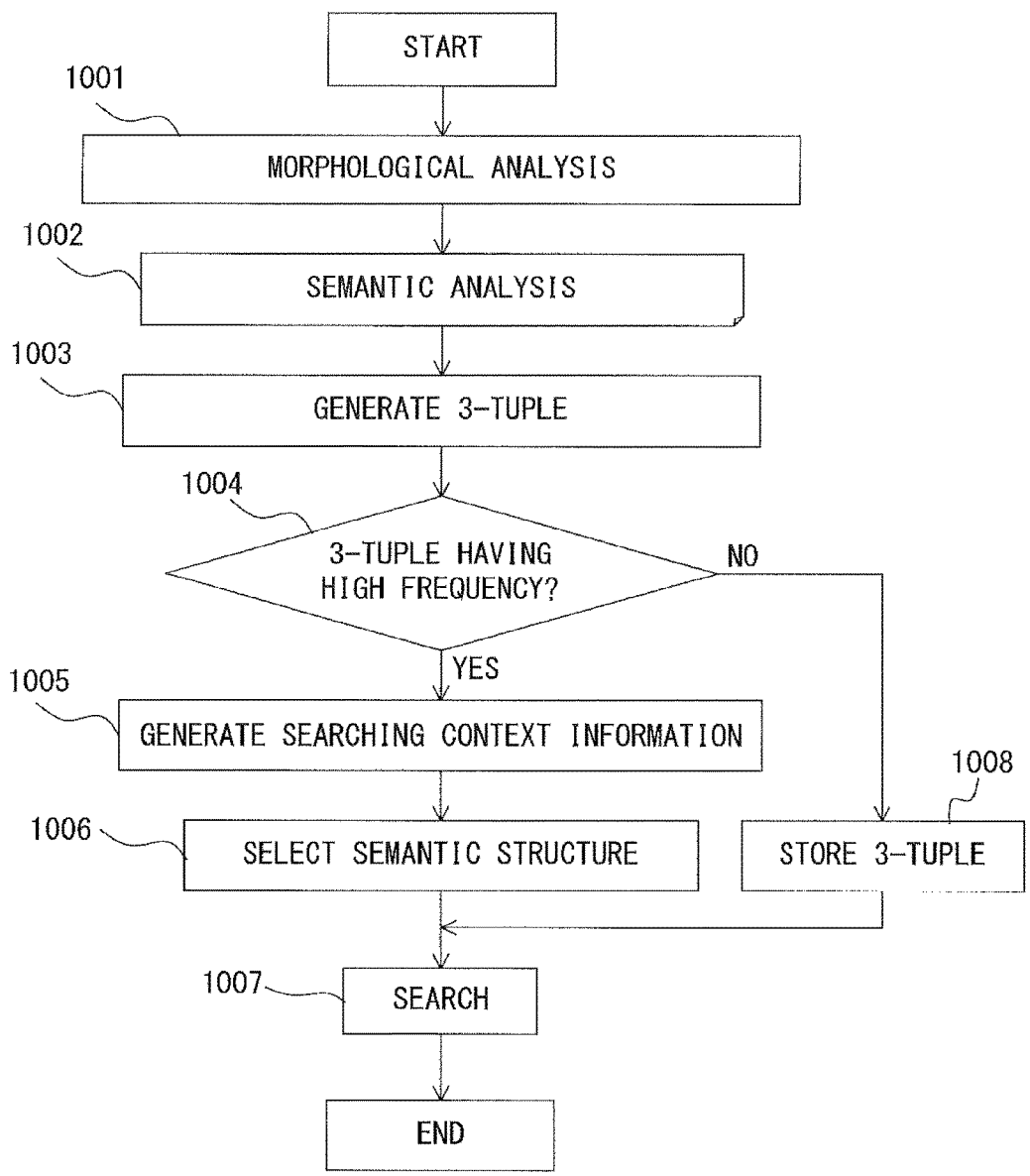
FIG. 10 is a flowchart illustrating a specific example of similar document search processing.

FIG. 10 is a flowchart illustrating an example of similar document search processing performed by the specification unit 212, the search unit 213, and the output unit 214. First, the code determination unit 411 performs morphological analysis on a searching query sentence so as to generate a morphological analysis result (step 1001), and performs semantic analysis on the searching query sentence so as to generate a semantic analysis result (step 1002). Then, the code determination unit 411 extracts three semantic codes from the semantic analysis result of the searching query sentence so as to generate a 3-tuple (step 1003).

The context generation unit 412 refers to the correspondence relationship 221, and checks whether the 3-tuple generated from the searching query sentence is a 3-tuple having a high frequency (step 1004). When a semantic structure including the 3-tuple generated from the searching query sentence is included in the correspondence relationship 221, it is determined that the 3-tuple is a 3-tuple having a high frequency.

As an example, in a case in which the 3-tuple "0xN3, 0xKR, 0xAM" is generated from the above searching query sentence Q1, and a semantic structure including "0xN3, 0xKR, 0xAM" is not included in the correspondence relationship 221, it is determined that the 3-tuple is not a 3-tuple having a high frequency.

In addition, in a case in which the 3-tuple "0xN3, 0xKR, 0xC1" is generated from the searching query sentence Q1, and a semantic structure including "0xN3, 0xKR, 0xC1" is not included in the correspondence relationship 221, it is determined that the 3-tuple is not a 3-tuple having a high frequency.

On the other hand, in a case in which the 3-tuple "0xKU, 0xS8, 0xK0" is generated from the searching query sentence Q1, and a semantic structure including "0xKU, 0xS8, 0xK0" is included in the correspondence relationship 221, it is determined that the 3-tuple is a 3-tuple having a high frequency.

When the 3-tuple generated from the searching query sentence is a 3-tuple having a high frequency (step 1004, YES), the context generation unit 412 generates searching context information from the searching query sentence (step 1005). The structure determination unit 413 selects a semantic structure from the correspondence relationship 221 in accordance with the searching context information, and stores the semantic structure as the search key 422 in the storing unit 211 (step 1006).

At this time, the structure determination unit 413 calculates a degree of similarity between context information that has been associated in the correspondence relationship 221 with each of the semantic structures including the 3-tuple having a high frequency that has been generated from the searching query sentence and the searching context information. As an example, in a case in which the 3-tuple "0xKU, 0xS8, 0xK0" is generated from the searching query sentence Q1, a degree of similarity between each of context information 502-1 to context information 502-N illustrated in FIG. 6 and the searching context information of the searching query sentence Q1 is calculated.

As the degree of similarity, a degree of similarity of a vector space model can be used, for example. In the vector space mode, an importance level Val (W, D) of a word W in a document D is calculated according to the following expressions.

$$Val(W,D)=tf(W,D)*idf(W) \quad (1)$$

$$idf(W)=\log(L/\text{dfreq}(W))+1 \quad (2)$$

In expression (1), tf(W,D) indicates the number of times of appearance of the word W in the document D. In expression (2), L indicates the total number of documents, and dfreq(W) indicates the number of documents that include the word W. In this case, the document D that indicates words W1 to Wn can be expressed by using a vector d in the expression below.

$$d=(Val(W1,D),Val(W2,D),\ldots,Val(Wn,D)) \quad (3)$$

A degree of similarity S(D1,D2) between a document D1 expressed by a vector d1 and a document D2 expressed by a vector d2 is expressed by a cosine value of an angle formed by the vector d1 and the vector d2, and is calculated according to the following expression.

$$S(D1,D2)=(d1\cdot d2)/(|d1|*|d2|) \quad (4)$$

In expression (4), |dj| (j=1, 2) indicates the magnitude of a vector dj, and d1·d2 indicates an inner product of the vector d1 and the vector d2. S(D1,D2) is a real number of 0 to 1, and it can be said that, as S(D1,D2) increases, a degree of similarity between two documents increases.

A degree of similarity between context information 502-*i* and the searching context information can be calculated by replacing documents in expressions (1) to (4) with pieces of context information and using the numbers of times of appearance of words included in each piece of context information as tf(W,D).

The structure determination unit 413 selects a semantic structure associated with context information having the largest degree of similarity as the search key 422. As an example, in a case in which a degree of similarity between the context information 502-1 and the searching context information is 0.46, and a degree of similarity between another context information 502-$i$ and the searching context information is smaller than 0.46, SS1 associated with the context information 502-1 is selected as the search key 422.

Then, the search unit 213 searches for a list of document IDs that correspond to the semantic structure as the search key 422 from the search index 421, and stores the list of documents IDS as the search result 423 in the storing unit 211 (step 1007). The output unit 214 outputs the search result 423.

On the other hand, when the 3-tuple generated from the searching query sentence is not a 3-tuple having a high frequency (step 1004, NO), the structure determination unit 413 stores the 3-tuple as the search key 422 in the storing unit 211 (step 1008).

The search unit 213 searches for a list of document IDs that correspond to the 3-tuple as the search key 422 from the search index 421, and stores the list of document IDs as the search result 423 in the storing unit 211 (step 1007). In this case, search is performed without distinguishing semantic structures of a 3-tuple, and therefore a search result 423 that corresponds to all of the variations in the semantic structure can be obtained.

In the similar document search processing above, in a case in which a 3-tuple having a high frequency that greatly affects a search result is used as the search key 422, an appropriate semantic structure that meets the intention of a query can be selected. Accordingly, search omission of a desired document can be prevented while effectively narrowing similar documents.

In a case in which the meaning of a 3-tuple having a high frequency does not differ so much depending on semantic structures, the influence of the semantic structure on a search result is small. Therefore, it is considered that the necessity to specify a semantic structure and generate the search key 422 is low. Accordingly, a degree of difference indicating a difference in meaning among a plurality of semantic structures that includes a 3-tuple having a high frequency can be calculated, and whether a semantic structure of the 3-tuple will be specified can be selected according to the degree of difference.

Figure 11:
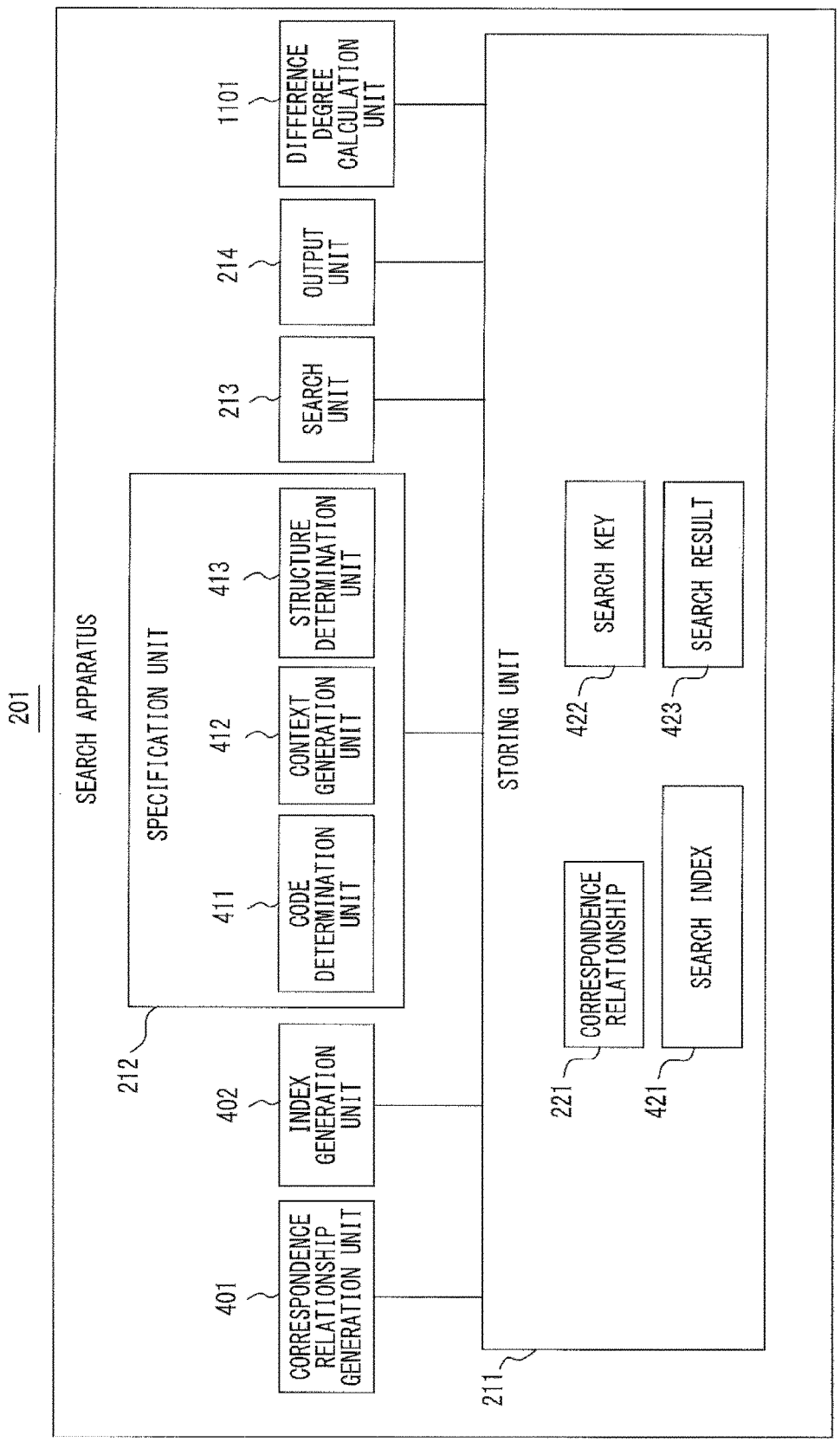
FIG. 11 is a functional block diagram illustrating a search apparatus using a degree of difference.

FIG. 11 illustrates an example of a functional configuration of a search apparatus 201 using a degree of difference. The search apparatus 201 of FIG. 11 has a configuration in which a difference degree calculation unit 1101 is added to the search apparatus 201 of FIG. 4. The difference degree calculation unit 1101 calculates a degree of difference for each of the 3-tuples having a high frequency, and the structure determination unit 413 specifies a semantic structure of a 3-tuple and generates the search key 422 when the degree of difference is large.

Figure 12:
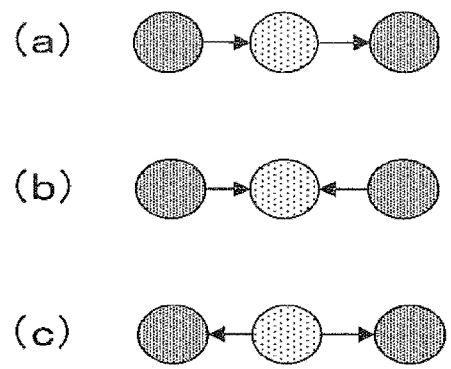
FIG. 12 illustrates variations in the orientation of an arc.

FIG. 12 illustrates examples of variations in the orientations of arcs included in a semantic structure of a 3-tuple. The semantic structure of a 3-tuple is classified into three types according to the orientations of two arcs. Type (a) represents a parallel semantic structure in which both of two arcs point in the same orientation. Type (b) represents a centralized semantic structure in which two arcs point in an orientation from a node at either of both ends to a central node. Type (c) represents a diffusion-type semantic structure in which two arcs point in an orientation from the central node to a node at either of both ends.

Semantic structures having the numbers "1", "4", "5", "8", "9", and "12" of FIG. 8 are parallel semantic structures. Semantic structures having the numbers "2", "6", and "10" are diffusion-type semantic structures. Semantic structures having the numbers "3", "7", and "11" are centralized semantic structures.

The difference degree calculation unit 1101 extracts all of the combinations of two semantic structures from variations in a semantic structure of a 3-tuple, and calculates a difference score P indicating a difference in meaning between the two semantic structures for each of the combinations. The difference degree calculation unit 1101 determines a maximum value of the obtained difference scores P to be a degree of difference of the 3-tuple. The structure determination unit 413 determines that the degree of difference of the 3-tuple is large when the degree of difference is greater than or equal to a prescribed value, and determines that the degree of difference is small when the degree of difference is smaller than the prescribed value.

As an example, in a case in which the prescribed value is 1.5, the difference degree calculation unit 1101 calculates the difference score P of two semantic structures according to the following procedure by using a central node of each of the semantic structures as a base-point node.

1. The difference degree calculation unit 1101 sets P to 0.

2. When a semantic code of a base-point node is different between two semantic structures, the difference degree calculation unit 1101 adds 1.5 to P. In this case, P=1.5 is established, and P reaches the prescribed value. Therefore, even when a difference score P is further calculated for another combination, a determination result of a degree of difference does not change. Accordingly, the difference degree calculation unit 1101 terminates calculating the difference score P, and determines the degree of difference of a 3-tuple to 1.5.

3. When two semantic structures have the same semantic code of a base-point node, the difference degree calculation unit 1101 breaks down each of the semantic structures into 2-tuple semantic structures, compares semantic structures including the same 2-tuple with each other, and adds a value to P.

The 2-tuple semantic structure is expressed as (starting-point node of arc, reached node of arc, type of arc). The difference degree calculation unit 1101 adds 1.0 to P when the order of the starting-point node and the reached node is different between two semantic structures, and the difference degree calculation unit 1101 adds 0.75 to P when the type of an arc is different between two semantic structures.

As an example, in a case in which a degree of difference of the 3-tuple "0xK0, 0xKU, 0xS8" of FIG. 1 is calculated, the difference degree calculation unit 1101 first calculates a difference score P of SS1 and SS2. A starting-point node of SS1 is "0xK0", and a starting-point node of SS2 is "0xS8", and therefore semantics codes of the starting-point nodes are different from each other. Accordingly, 1.5 is added to P. At this point in time, P reaches 1.5, and therefore the difference degree calculation unit 1101 determines the degree of difference of "0xK0, 0xKU, 0xS8" to 1.5 without calculating a difference score P for another combination.

Figure 13:
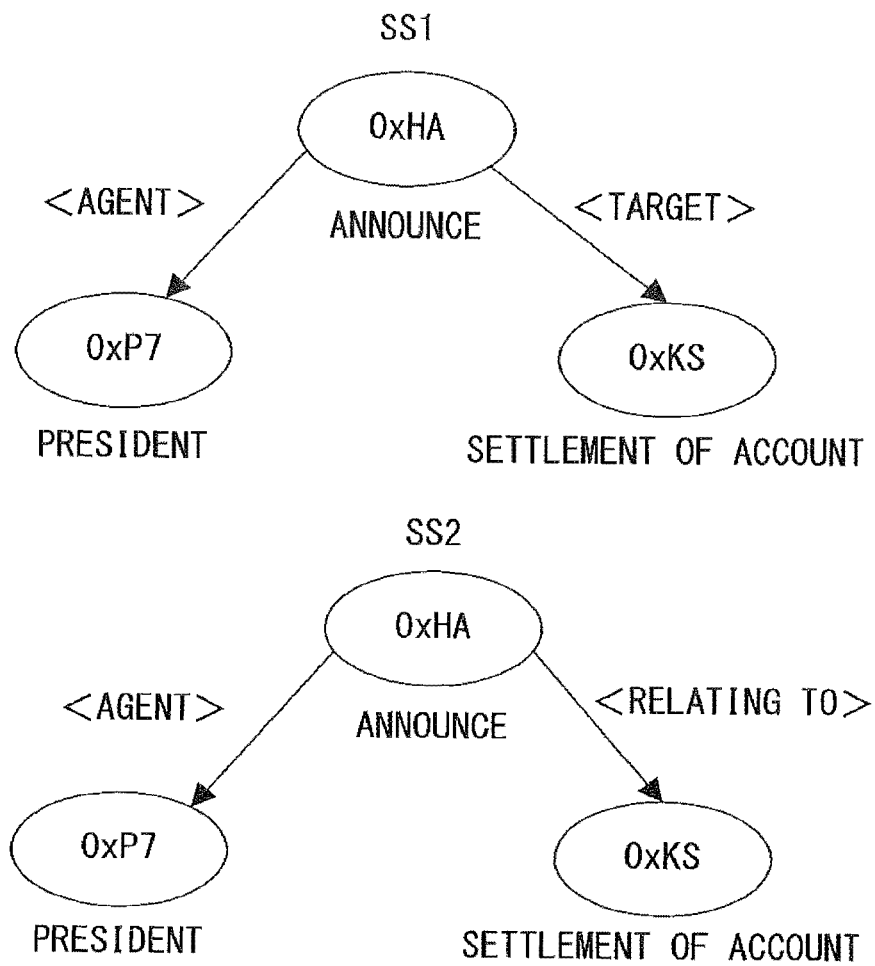
FIG. 13 illustrates a 3-tuple having a small degree of difference.

FIG. 13 illustrates an example of a 3-tuple having a small degree of difference. As described above, the number of appearance documents of the 3-tuple "0xHA, 0xKS, 0xP7" of FIG. 13 is 78370, and is greater than 60000. Therefore, this 3-tuple falls under a 3-tuple having a high frequency. In a case in which a semantic structure of "0xHA, 0xKS, 0xP7" has two variations, SS1 and SS2 of FIG. 13, the difference degree calculation unit 1101 calculates a difference score P of SS1 and SS2.

Both of the starting-point nodes of SS1 and SS2 are "0xHA", and therefore the difference degree calculation unit 1101 breaks down each of SS1 and SS2 into the following 2-tuple semantic structures (partial structures).

SS1: (0xHA, 0xP7, agent), (0xHA, 0xKS, target)
SS2: (0xHA, 0xP7, agent), (0xHA, 0xKS, relating to)

When the partial structure (0xHA, 0xP7, agent) of SS1 and the partial structure (0xHA, 0xP7, agent) of SS2 that each include the 2-tuple "0xHA, 0xP7" are compared, the order of a starting-point node and a reached node is the same as each other, and the type of an arc is the same as each other. Accordingly, P does not increase as a result of this comparison.

When the partial structure (0xHA, 0xKS, target) of SS1 and the partial structure (0xHA, 0xKS, relating to) of SS2 that each include the 2-tuple "0xHA, 0xKS" are compared, the order of a starting-point node and a reached node is the same as each other, but the type of an arc is different from each other. Accordingly, 0.75 is added to P as a result of this comparison. There are no other combinations of two semantic structures, and therefore the difference degree calculation unit 1101 determines a degree of difference of "0xHA, 0xKS, 0xP7" to 0.75.

Figure 14:
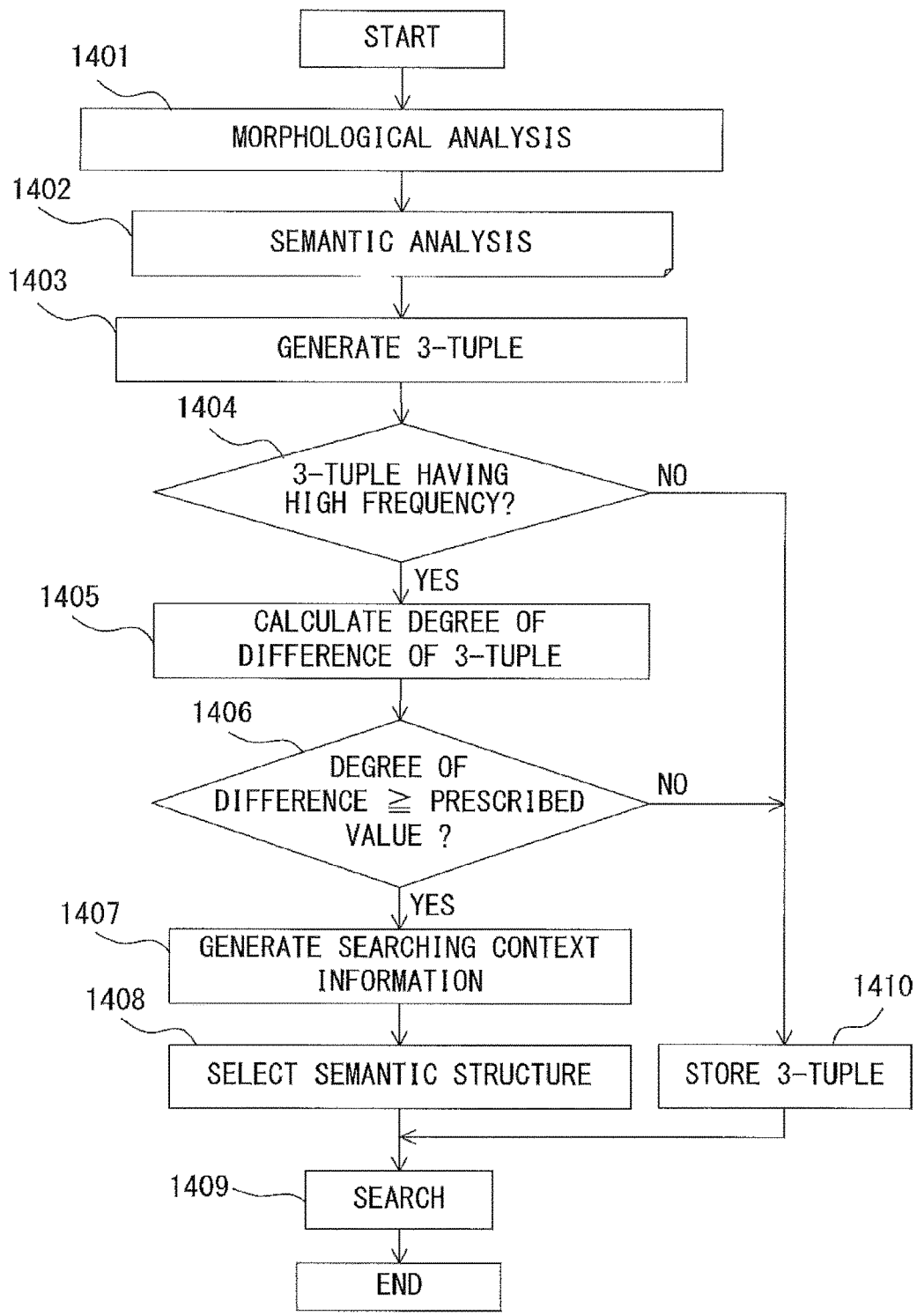
FIG. 14 is a flowchart of similar document search processing using a degree of difference.

FIG. 14 is a flowchart illustrating an example of similar document search processing using a degree of difference. The processes of steps 1401 to 1404 and 1407 to 1410 in FIG. 14 are similar to the processes of steps 1001 to 1008 in FIG. 10.

When a 3-tuple generated from a searching query sentence is a 3-tuple having a high frequency (step 1404, YES), the difference degree calculation unit 1101 calculates a degree of difference of the 3-tuple (step 1405), and the structure determination unit 413 compares the degree of difference with a prescribed value (step 1406). When the degree of difference is greater than or equal to the prescribed value (step 1406, YES), the search apparatus 201 performs the process of step 1407 and the processes that follow. When the degree of difference is smaller than the prescribed value (step 1406, NO), the search apparatus 201 performs the process of step 1410 and the processes that follow.

As an example, in a case in which the prescribed value is 1.5, a degree of difference of "0xK0, 0xKU, 0xS8" of FIG. 1 is 1.5. Therefore, it is determined that the degree of difference is greater than or equal to the prescribed value. On the other hand, a degree of difference of "0xHA, 0xKS, 0xP7" of FIG. 13 is 0.75, and therefore it is determined that the degree of difference is smaller than the prescribed value.

In the similar document search processing above, only when meaning greatly changes according to a semantic structure of a 3-tuple having a high frequency, a specific semantic structure is selected according to searching context information, and a search result 423 that corresponds to the selected semantic structure is obtained. On the other hand, when meaning does not change so much according to a semantic structure, a search result 423 that corresponds to all of the variations in the semantic structure is obtained. In this case, processing for generating searching context information from a searching query sentence can be omitted.

The search apparatus 201 of FIG. 11 can calculate a degree of difference of a 3-tuple having a high frequency when a database is generated, and can select whether a correspondence relationship 221 for the 3-tuple will be generated in accordance with the degree of difference.

Figure 15:
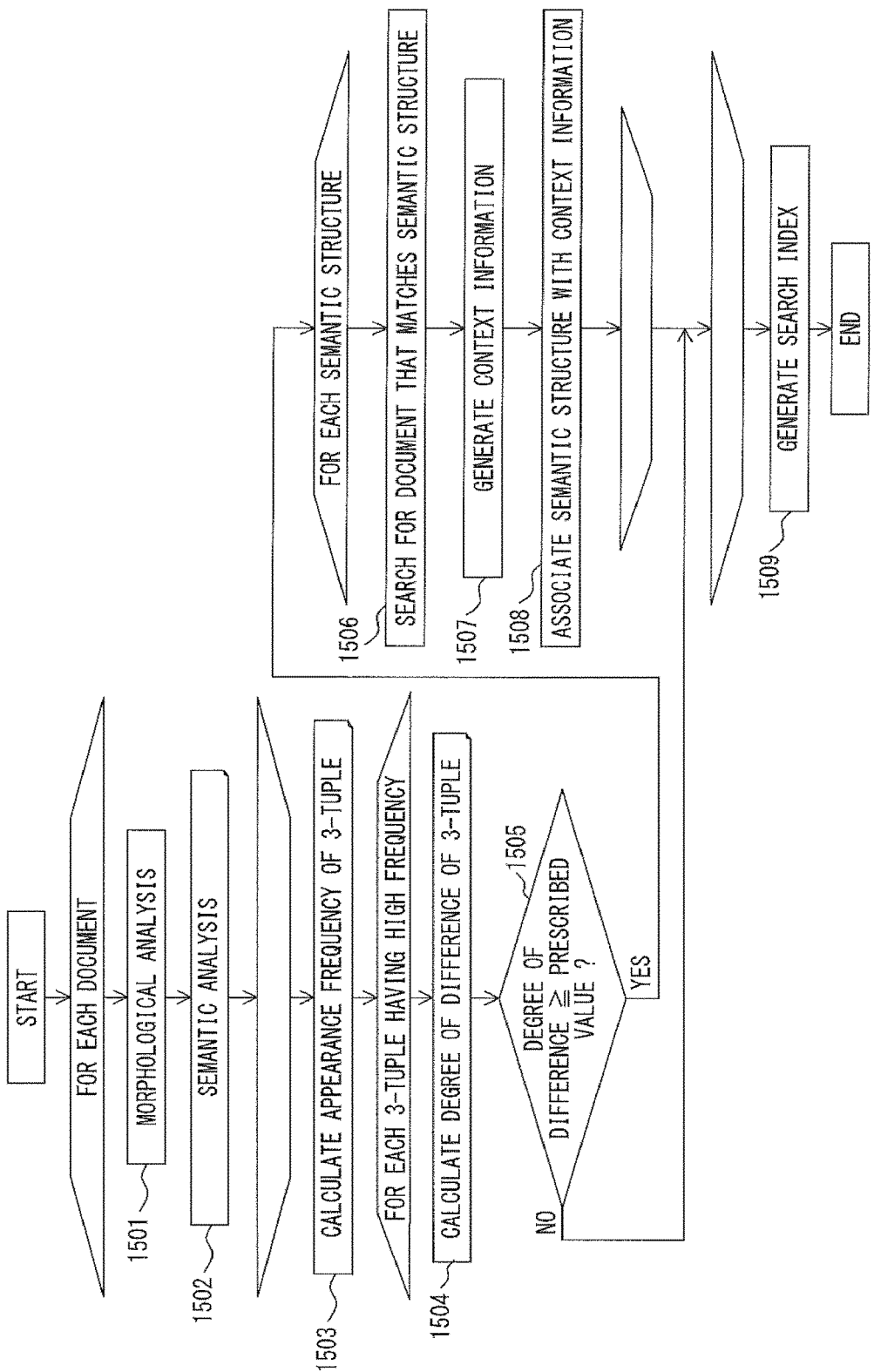
FIG. 15 is a flowchart of database generation processing using a degree of difference.

FIG. 15 is a flowchart illustrating an example of database generation processing using a degree of difference. The processes of steps 1501 to 1503 and 1506 to 1509 in FIG. 15 are similar to the processes of steps 901 to 907 in FIG. 9.

The difference degree calculation unit 1101 calculates a degree of difference for a 3-tuple having a high frequency of 3-tuples generated in step 1503 (step 1504), and the correspondence relationship generation unit 401 compares the degree of difference with a prescribed value (step 1505). When the degree of difference is greater than or equal to the prescribed value (step 1505, YES), the search apparatus 201 performs the process of step 1506 and the processes that follow. When the degree of difference is smaller than the prescribed value (step 1505, NO), the search apparatus 201 performs the process of step 1504 and the processes that follow on the next 3-tuple having a high frequency.

In the database generation processing above, only when meaning greatly changes according to a semantic structure of a 3-tuple having a high frequency, a correspondence relationship 221 for the 3-tuple is generated. When meaning does not change so much according to the semantic structure, the correspondence relationship 221 is not generated, and therefore correspondence relationship generation processing can be omitted.

In a case in which the similar document search processing of FIG. 10 is performed by using the correspondence relationship 221 generated in the database generation processing of FIG. 15, it is determined in step 1004 that a 3-tuple that is not included in the correspondence relationship 221 is not a 3-tuple having a high frequency. Accordingly, search is performed without distinguishing semantic structures of the 3-tuple, and a search result 423 that corresponds to all of the variations in the semantic structure is obtained.

As an example, a degree of difference of "0xHA, 0xKS, 0xP7" of FIG. 13 is 0.75, and therefore it is determined that the degree of difference is smaller than the prescribed value, and a correspondence relationship 221 for this 3-tuple is not generated. Accordingly, in the similar document search processing, it is determined that "0xHA, 0xKS, 0xP7" is not a 3-tuple having a high frequency, and search is performed without distinguishing semantic structures.

When the degree of difference is smaller than the prescribed value in step 1505, the correspondence relationship generation unit 401 may store information indicating that the 3-tuple is a 3-tuple having a low frequency in the storing unit 211. In this case, it is determined in step 1004 that the 3-tuple is not a 3-tuple having a high frequency in accordance with the information stored in the storing unit 211.

The configurations illustrated in FIGS. 2, 4, and 11 of the search apparatus 201 are examples, and some of the components may be omitted or changed according to the purpose or condition of the search apparatus 201. As an example, in a case in which the database generation processing is performed by an external device, the correspondence relationship generation unit 401 and the index generation unit 402 of FIGS. 4 and 11 can be omitted.

The flowcharts of FIGS. 3, 9, 10, 14, and 15 are examples, and some of the processes may be omitted or changed according to the configuration or condition of the search apparatus 201. As an example, in a case in which morphological analysis and semantic analysis are performed on documents by an external device in the database generation processing of FIGS. 9 and 15, the processes of steps 901, 902, 1501, and 1502 can be omitted. In a case in which the search index 421 is generated by an external device, the processes of steps 907 and 1509 can be omitted.

In the database generation processing of FIG. 9, in a case in which the correspondence relationship 221 is generated regardless of whether a 3-tuple has a high frequency, calculation of the appearance frequency of the 3-tuple can be omitted in step 903. In this case, the processes of steps 904 to 906 are performed on all of the 3-tuples generated from a list of semantic codes.

In the database generation processing of FIG. 15, in a case in which the correspondence relationship 221 is generated only according to a degree of difference of a 3-tuple regardless of whether the 3-tuple has a high frequency, calculation of the appearance frequency of the 3-tuple can be omitted in step 1503. In this case, the processes of steps 1504 to 1508 are performed on all of the 3-tuples generated from a list of semantic codes.

In the similar document search processing of FIGS. 10 and 14, in a case in which morphological analysis and semantic analysis are performed on a searching query sentence by an external device, the processes of steps 1001, 1002, 1401, and 1402 can be omitted.

In the similar document search processing of FIG. 10, in a case in which a semantic structure is specified and search is performed regardless of whether a 3-tuple has a high frequency, the processes of steps 1004 and 1008 can be omitted.

In the similar document search processing of FIG. 14, in a case in which a semantic structure is specified and search is performed only according to a degree of difference of a 3-tuple, regardless of whether the 3-tuple has a high frequency, the process of step 1404 can be omitted.

The semantic structures in FIGS. 1, 5, 6, 8, 12, and 13 are examples, and other semantic structures may be used according to the configuration or condition of the search apparatus 201. As an example, a semantic structure including four or more semantic codes may be used instead of a 3-tuple semantic structure. The search index of FIG. 7 is an example, and a search index having another data structure may be used according to the configuration or condition of the search apparatus 201.

Expressions (1) to (4) are examples, and a degree of similarity between context information included in the correspondence relationship 221 and searching context information may be calculated according to other calculation expressions.

Figure 16:
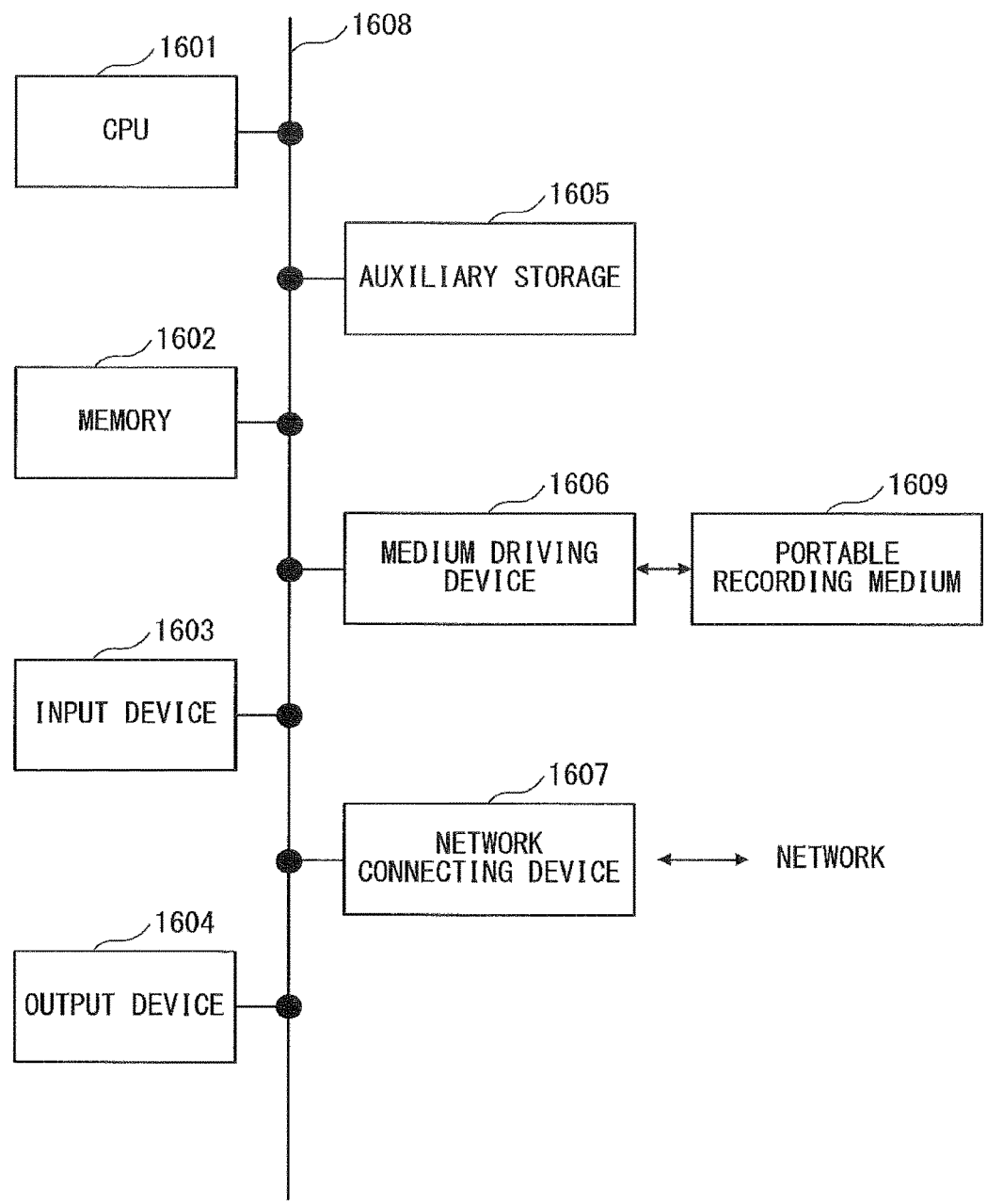
FIG. 16 is a block diagram illustrating an information processing device.

The search apparatuses 201 of FIGS. 2, 4 and 11 can be implemented by using an information processing device (a computer) illustrated in FIG. 16, for example. The information processing device of FIG. 16 includes a central processing unit (CPU) 1601, a memory 1602, an input device 1603, an output device 1604, an auxiliary storage 1605, a medium driving device 1606, and a network connecting device 1607. These components are connected to each other via a bus 1608.

The memory 1602 is a semiconductor memory such as a read only memory (ROM), a random access memory (RAM), or a flash memory, and the memory 1602 stores a program and data used for processing. The memory 1602 can be used as the storing unit 211 of FIG. 2, 4, or 11.

The CPU 1601 (a processor) operates as the specification unit 212, the search unit 213, the correspondence relationship generation unit 401, the index generation unit 402, and the difference degree calculation unit 1101 illustrated in FIGS. 2, 4, and 11 by executing a program by using the memory 1602, for example. The CPU 1601 also operates as the code determination unit 411, the context generation unit 412, and the structure determination unit 413 by executing a program.

The input device 1603 is, for example, a keyboard, a pointing device, or the like, and the input device 1603 is used to input an instruction from an operator or a user, or information. The instruction from the operator or the user may be a query including a searching query sentence.

The output device 1604 is, for example, a display device, a printer, a speaker, or the like, and the output device 1604 is used to output inquiry or an instruction to/from an operator or a user, and a processing result. The output device 1604 can be used as the output unit 214 of FIGS. 2, 4, and 11. The processing result may be the search result 423.

The auxiliary storage 1605 is, for example, a magnetic disk device, an optical disk device, a magneto-optical disk device, a tape device, or the like. The auxiliary storage 1605 may be a hard disk drive or a flash memory. The information processing device can store a program and data in the auxiliary storage 1605, and can use them by loading them into the memory 1602. The auxiliary storage 1605 can be used as the storing unit 211 of FIG. 2, 4, or 11.

The medium driving device 1606 drives a portable recording medium 1609, and accesses the content recorded in the portable recording medium 1609. The portable recording medium 1609 is a memory device, a flexible disk, an optical disk, a magneto-optical disk, or the like. The portable recording medium 1609 may be a compact disk read only memory (CD-ROM), a digital versatile disk (DVD), a universal serial bus (USB) memory, or the like. An operator or a user can store a program and data in the portable recording medium 1609, and can use them by loading them into the memory 1602.

As described above, a computer-readable recording medium that stores a program and data used for processing is a physical (non-transitory) recording medium such as the memory 1602, the auxiliary storage 1605, or the portable recording medium 1609.

The network connecting device 1607 is a communication interface that is connected to a communication network such as a Local Area Network, a Wide Area Network, or the like, and that performs data conversion associated with communication. The information processing device can receive a program and data from an external device via the network connecting device 1607, and can use them by loading them into the memory 1602.

The information processing device can receive a query from a user terminal via the network connecting device 1607, and can transmit the search result 423 to the user terminal. In this case, the network connecting device 1607 is used as the output unit 214 of FIG. 2, 4, or 11.

The information processing device does not need to include all of the components in FIG. 16, and some of the components can be omitted according to the purpose or condition. As an example, in a case in which the information processing device receives a query from a user terminal via a communication network, the input device 1603 and the output device 1604 may be omitted. In a case in which the portable recording medium 1609 or the communication network is not used, the medium driving device 1606 or the network connecting device 1607 may be omitted.

In a case in which the information processing device is a portable terminal having a call function, such as a smart phone, the information processing device may include a call device such as a microphone and a speaker, and may include an imaging device such as a camera.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a search program for causing a computer to execute a process comprising:
generating searching context information relating to appearance frequencies of words or semantic codes in a searching query sentence from the searching query sentence;
specifying one semantic structure from among a plurality of semantic structures in accordance with a plurality of context information and the searching context information by using a correspondence relationship between the plurality of semantic structures and the plurality of context information; and
searching for a similar document from a plurality of documents by using the specified semantic structure,
wherein the correspondence relationship is generated by performing semantic analysis on a plurality of sentences included in the plurality of documents, by generating the plurality of semantic structures based on relationship types among a plurality of semantic codes included in each of the plurality of sentences, by generating the plurality of context information, and by respectively associating the plurality of semantic structures with the plurality of context information, and
wherein each of the plurality of semantic structures includes three or more semantic codes and a relationship type among the three or more semantic codes and each of the plurality of context information relates to an appearance frequency of a word or a semantic code in a group of documents that match each of the plurality of semantic structures from among the plurality of documents.

2. The non-transitory computer-readable recording medium according to claim 1, the process further comprising:
generating a set of three or more semantic codes from a plurality of semantic codes included in the searching query sentence, wherein
the specifying the one semantic structure obtains a degree of similarity between each of a plurality of context information and the searching context information, the each of the plurality of context information being associated with each of a plurality of semantic structures including the set of the three or more semantic codes that has been generated from the searching query sentence, and specifies a semantic structure associated with context information having a largest degree of similarity as the one semantic structure.

3. The non-transitory computer-readable recording medium according to claim 2, wherein
the generating the searching context information generates the searching context information from the searching query sentence when an appearance frequency in the plurality of documents of the set of the three or more semantic codes that has been generated from the searching query sentence, is greater than a first prescribed value, and
the specifying the one semantic structure obtains the degree of similarity and specifies the one semantic structure when the appearance frequency is greater than the first prescribed value.

4. The non-transitory computer-readable recording medium according to claim 2, wherein
the generating the searching context information generates the searching context information from the searching query sentence when a degree of difference is greater than a second prescribed value, the degree of difference indicating a difference in meaning among the plurality of semantic structures including the set of the three or more semantic codes that has been generated from the searching query sentence, and
the specifying the one semantic structure obtains the degree of similarity and specifies the one semantics structure when the degree of difference is greater than the second prescribed value.

5. The non-transitory computer-readable recording medium according to claim 1, the process further comprising:
performing the semantic analysis on the plurality of sentences, and generating the plurality of semantic structures;
generating the plurality of context information that respectively correspond to the plurality of semantic structures; and
generating the correspondence relationship between the plurality of semantic structures and the plurality of context information.

6. A search apparatus comprising:
a memory that stores a correspondence relationship between a plurality of semantic structures and plural pieces of context information, wherein the correspondence relationship is generated by performing semantic analysis on a plurality of sentences included in a plurality of documents, by generating the plurality of semantic structures based on relationship types among a plurality of semantic codes included in each of the plurality of sentences, by generating the plurality of context information, and by respectively associating the plurality of semantic structures with the plurality of context information, and wherein each of the plurality of semantic structures includes three or more semantic codes and a relationship type among the three or more semantic codes and each of the plurality of context information relates to an appearance frequency of a word or a semantic code in a group of documents that match each of the plurality of semantic structures from among the plurality of documents; and
a processor that generates searching context information relating to appearance frequencies of words or semantic codes in a searching query sentence from the searching query sentence, specifies one semantic structure from among the plurality of semantic structures in accordance with the plurality of context information and the searching context information, searches for a similar document from the plurality of documents by using the specified semantic structure.

7. The search apparatus according to claim 6, wherein
the processor generates a set of three or more semantic codes from a plurality of semantic codes included in the searching query sentence, obtains a degree of similarity between each of a plurality of context information and the searching context information, the each of the plurality of context information being associated with each of a plurality of semantic structures including the set of the three or more semantic codes that has been generated from the searching query sentence, and specifies a semantic structure associated with context information having a largest degree of similarity as the one semantic structure.

8. The search apparatus according to claim 7, wherein
the processor generates the searching context information from the searching query sentence, obtains the degree of similarity, and specifies the one semantic structure, when an appearance frequency in the plurality of documents of the set of the three or more semantic codes that has been generated from the searching query sentence, is greater than a first prescribed value.

9. The search apparatus according to claim 7, wherein
the processor generates the searching context information from the searching query sentence, obtains the degree of similarity, and specifies the one semantics structure, when a degree of difference is greater than a second prescribed value, the degree of difference indicating a difference in meaning among the plurality of semantic structures including the set of the three or more semantic codes that has been generated from the searching query sentence.

10. The search apparatus according to claim 6, wherein
the processor performs the semantic analysis on the plurality of sentences, generates the plurality of semantic structures, generates the plurality of context information that respectively correspond to the plurality of semantic structures, and generates the correspondence relationship between the plurality of semantic structures and the plurality of context information.

11. A search method comprising:
generating, by a processor, searching context information relating to appearance frequencies of words or semantic codes in a searching query sentence from the searching query sentence;
specifying, by the processor, one semantic structure from among a plurality of semantic structures in accordance with a plurality of context information and the searching context information by using a correspondence relationship between the plurality of semantic structures and the plurality of context information; and
searching for, by the processor, a similar document from a plurality of documents by using the specified semantic structure,
wherein the correspondence relationship is generated by performing semantic analysis on a plurality of sentences included in the plurality of documents, by generating the plurality of semantic structures based on relationship types among a plurality of semantic codes included in each of the plurality of sentences, by generating the plurality of context information, and by respectively associating the plurality of semantic structures with the plurality of context information, and
wherein each of the plurality of semantic structures includes three or more semantic codes and a relationship type among the three or more semantic codes and each of the plurality of context information relates to an appearance frequency of a word or a semantic code in a group of documents that match each of the plurality of semantic structures from among the plurality of documents.

12. The search method according to claim 11, the process further comprising:
generating a set of three or more semantic codes from a plurality of semantic codes included in the searching query sentence, wherein
the specifying the one semantic structure obtains a degree of similarity between each of a plurality of context information and the searching context information, the each of the plurality of context information being associated with each of a plurality of semantic structures including the set of the three or more semantic codes that has been generated from the searching query sentence, and specifies a semantic structure associated with context information having a largest degree of similarity as the one semantic structure.

13. The search method according to claim 12, wherein
the generating the searching context information generates the searching context information from the searching query sentence when an appearance frequency in the plurality of documents of the set of the three or more semantic codes that has been generated from the searching query sentence, is greater than a first prescribed value, and
the specifying the one semantic structure obtains the degree of similarity and specifies the one semantic structure when the appearance frequency is greater than the first prescribed value.

14. The search method according to claim 12, wherein
the generating the searching context information generates the searching context information from the searching query sentence when a degree of difference is greater than a second prescribed value, the degree of difference indicating a difference in meaning among the plurality of semantic structures including the set of the three or more semantic codes that has been generated from the searching query sentence, and
the specifying the one semantic structure obtains the degree of similarity and specifies the one semantics structure when the degree of difference is greater than the second prescribed value.

15. The search method according to claim 11, the process further comprising:
performing the semantic analysis on the plurality of sentences, and generating the plurality of semantic structures;
generating the plurality of context information that respectively correspond to the plurality of semantic structures; and
generating the correspondence relationship between the plurality of semantic structures and the plurality of context information.

\* \* \* \* \*